United States Patent [19]

Gimmler

[11] Patent Number: 5,215,173
[45] Date of Patent: Jun. 1, 1993

[54] HYDRODYNAMIC TORQUE CONVERTER

[75] Inventor: Joachim Gimmler, Dittelbrunn, Fed. Rep. of Germany

[73] Assignee: Fichtel & Sachs AG, Schweinfurt, Fed. Rep. of Germany

[21] Appl. No.: 906,150

[22] Filed: Jun. 29, 1992

[30] Foreign Application Priority Data

Jun. 29, 1991 [DE] Fed. Rep. of Germany ....... 4121586

[51] Int. Cl.⁵ ............................................. F16H 45/02
[52] U.S. Cl. ................................. 192/3.3; 192/3.29
[58] Field of Search .................... 192/3.28, 3.29, 3.3

[56] References Cited

U.S. PATENT DOCUMENTS

| 3,693,478 | 9/1972 | Malloy | 192/3.3 X |
| 3,730,315 | 5/1973 | Annis et al. | 192/3.3 |
| 4,582,185 | 4/1986 | Grimes et al. | 192/3.3 X |
| 4,618,038 | 10/1986 | Osasawara et al. | 192/3.29 |
| 4,664,235 | 5/1987 | Yokoyama et al. | 192/3.29 |
| 4,889,012 | 12/1989 | Dull | 192/3.3 X |
| 4,989,702 | 2/1991 | Yoshimura et al. | 192/3.29 |
| 5,060,769 | 10/1991 | Yoshimura et al. | 192/3.29 |
| 5,090,527 | 2/1992 | Imamura et al. | 192/3.29 |

FOREIGN PATENT DOCUMENTS

| 0248766 | 10/1990 | Japan | 192/3.29 |
| 2130311 | 5/1984 | United Kingdom | 192/3.29 |

Primary Examiner—Richard M. Lorence
Attorney, Agent, or Firm—Anderson Kill Olick & Oshinsky

[57] ABSTRACT

The invention relates to a hydrodynamic torque converter with a lock-up clutch. The converter circuit is charged with converter fluid via two lines which may be reversed. A further liquid path which allows cooling of the piston of the lock-up clutch on its back via throttle channels is provided in parallel with the pressure line for opening the lock-up clutch.

12 Claims, 5 Drawing Sheets

HYDRODYNAMIC TORQUE CONVERTER

BACKGROUND OF THE INVENTION

The invention relates to a hydrodynamic torque converter. From DE-OS 29 43 194 a torque converter is known having a lock-up clutch. With this known construction, two fluid connections between the torque converter and a pump are merely reversed when the lock-up clutch is engaged and disengaged. In one state, the lock-up clutch is open and the torque is transmitted completely via the torque converter and, in the other state, the lock-up clutch is closed and the torque is transmitted past the converter, for example via a torsional vibration damper, directly to the gearbox.

SUMMARY OF THE INVENTION

The invention improves the cooling of frictional faces of the lock-up clutch in a hydrodynamic torque converter without influencing the transmission capacity of the lock-up clutch which is required, in particular during possible slippage.

It is an advantage of the invention that, on the one hand, the engagement process for the lock-up clutch may be carried out reliably and, on the other hand—during operation with a completely or partially engaged lock-up clutch—desirable cooling oil guidance may be achieved, in order to cool the back of a clutch operating piston provided with a frictional face by means of a continuous small cooling oil stream. When the lock-up clutch is engaged, the hydraulic medium of the torque converter flows between a turbine wheel of the converter and the piston so that it can carry out the cooling function.

A further advantage of the present invention resides in the fact that unthrottled connecting paths from a space between the piston and a converter casing open in a region of which the diameter corresponds substantially to the diameter of a connecting bore in the driven shaft. This arrangement improves the transmission capacity of the lock-up clutch substantially independently of speed and oil throughput. In fact, this construction ensures that virtually no pressure-reducing forces from the other volume of fluid can act upon the back of the piston.

Throttle portions may be arranged in a hub of the turbine wheel, in which case they connect the space between piston and turbine wheel to the longitudinal bore in the driven shaft, ensuring that the path via the throttle portions is produced independently of wear.

In a preferred embodiment, a substantially fluid-tight axial-radial bearing is provided between the hub of the turbine wheel and a bearing projection of the converter casing so it is sufficient merely to provide the hub with a seal from the driven shaft. Channels forming the throttle portions may also simply be provided in the hub of the turbine wheel in this case.

The fluid supply channels in the bearing projection are preferably designed as obliquely extending bores adapted to the course of the bearing projection and may easily be produced. They are dimensioned such that they do not act as a throttle portion.

In a further embodiment, the piston rests on a supporting ring designed integrally with the bearing projection. This is particularly appropriate if the lock-up clutch has a blade which is arranged between piston and converter casing and transmits the torque preferably directed to the outer shell of the turbine wheel when the lock-up clutch is engaged. In this case, the throttle portions are integrated in a bearing ring arranged between the supporting ring and the hub of the turbine wheel. This bearing ring has, on its external diameter relativ to the supporting ring, a plurality of peripherally distributed longitudinal grooves forming said throttle portions. Such an arrangement may be produced particularly economically. With this construction, the channels are produced as obliquely extending bores in the bearing projection.

However, the construction may also be designed such that the channels leading into the space between piston and converter casing are introduced into the supporting ring at the end face, the supporting ring being partially welded to the converter casing. A substantially pot-shaped sheet metal part which guarantees the guidance of the fluid stream to a central opening of the sheet metal part is also inserted into the supporting ring.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
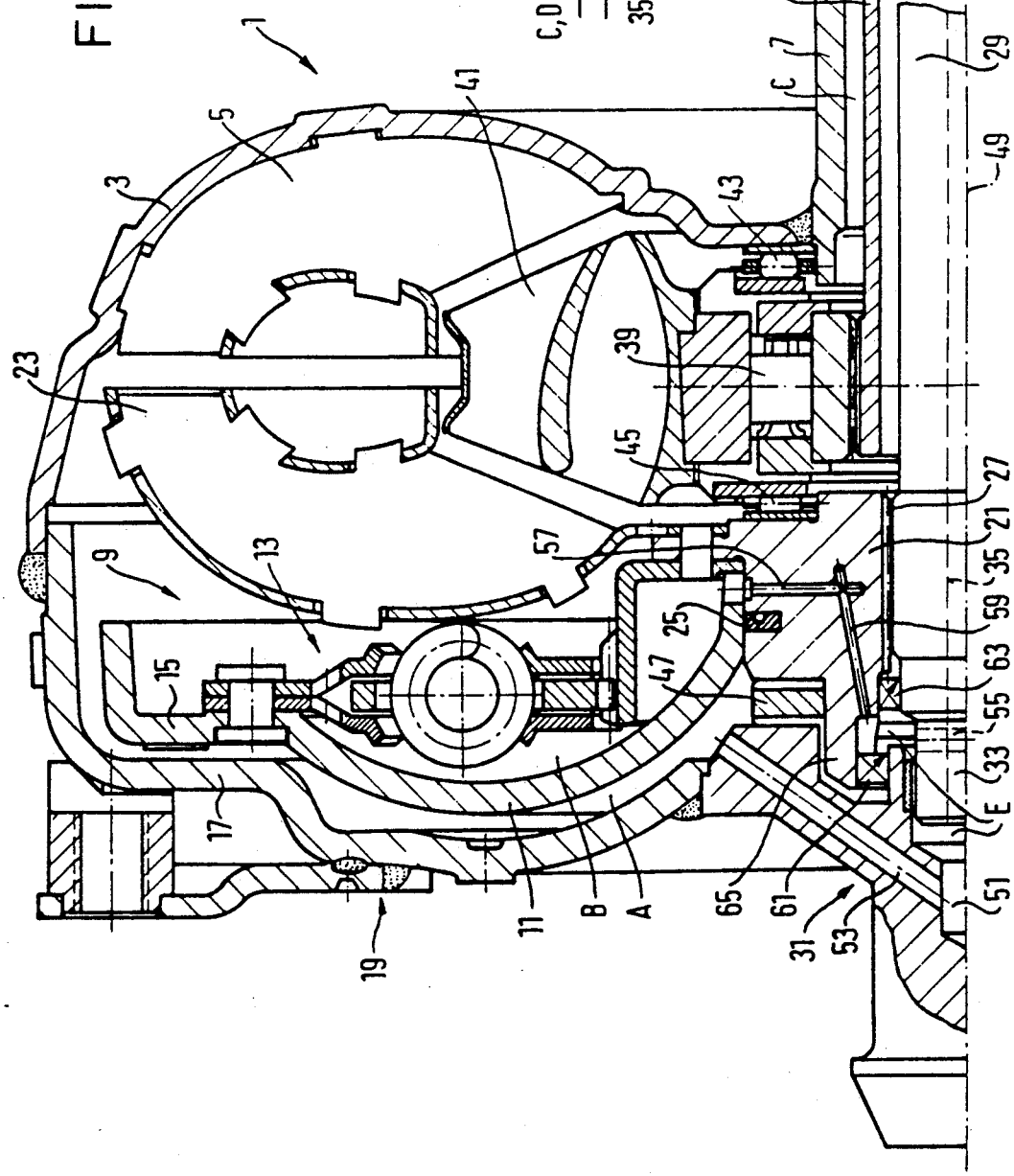
FIG. 1 is the upper half of an axial longitudinal section through a torque converter comprising a lock-up clutch and a torsional vibration damper.

FIG. 1 shows a hydrodynamic torque converter 1 with a converter casing 3 which is designed directly as a pump wheel 5 and is driven by an internal combustion engine. The converter casing 3 opens directly into a tube 7 which is mounted in a gearbox (not shown) and there drives a pump P for supplying the torque converter with hydraulic fluid. The converter casing 3 surrounds a lock-up clutch 9 having a piston 11 and a torsional vibration damper 13. The piston 11 has, in the region of its outer periphery, a first radial region 15 which extends parallel to a second radial region 17 of a drive-side wall region 19 of the converter casing 3, the first and second regions 15, 17 being sealed relative to one another. With interposition of a friction lining, the entire torque may be transmitted at this point if the lock-up clutch 9 is appropriately engaged. The piston 11 rests radially internally on a hub 21 of a turbine wheel 23 and is axially displaceable relative thereto and sealed by a seal 25. The hub 21 is mounted directly via teeth 27 on a driven shaft 29 leading to the gearbox. The driven shaft 29 extends toward the internal combustion engine into a bearing projection 31 which is guided in the crankshaft (not shown) of the internal combustion engine. The driven shaft 29 is mounted via a projection 33 in the bearing projection 31. It has a longitudinal bore 35 which opens in the gearbox on the driven side and leads from the driven shaft 29 on the drive side. The tube 7 for driving the pump P extends concentrically to the driven shaft 29 and a supporting shaft 37 carrying a freewheel 39 for a wheel 41 is additionally arranged in a radial intermediate space C, D. The wheel 41 is supported axially on both sides by a respective thrust bearing 43 or 45, more specifically on the one hand relative to the converter casing 3 and on the other hand relative to the hub 21 of the turbine wheel 23. The turbine wheel 23 is axially also supported via a thrust bearing 47 relative to the bearing projection 31. All rotating parts of the hydrodynamic torque converter 1 are arranged concentrically to an axis of rotation 49. In the bearing projection 31 there is arranged, from the driven shaft 29, a blind hole 51 from which there issue a plurality of obliquely radially outwardly extending channels 53 which reach into a space A between the piston 11 and the drive-side wall region 19 of the converter casing 3. Between the end of the driven shaft 29 on the internal combustion engine side, the bearing projection 31 and the hub 21 there is formed a space E which, through a transverse bore 55 in the driven shaft 29, produces a connection between the longitudinal bore 35 and the blind bore 51 on the one hand and a connection via channels 57 and 59 to a space B between the piston 11 and the external wall of the turbine wheel 23 on the other hand. The channels 57 and 59 are designed as throttle bores having a small cross-sectional area. For a reliable connection between these spaces there are provided two seals 61 and 63 which are arranged, on the one hand, between the hub 21 and the driven shaft 29 and between a projection 65 of the hub 21 and a corresponding region of the bearing projection 31. These seals ensure that the space E can communicate only via the channels 53 with the space A and only via the channels 57 and 59 with the space B. The space of the converter-oil circuit is connected to the pump P via the concentric spaces C and D which extend on both sides of the supporting shaft 37. The space C leads from the pump P via the intermediate spaces of the thrust bearing 43 toward the pump wheel 5, and the space D via the intermediate spaces of the thrust bearing 45 into the turbine wheel 27. A changeover valve 69 is arranged between the longitudinal bore 35 as well as the spaces C and D and the pump P or a reservoir 67 for converter fluid.

The mode of operation of the converter is accordingly as follows:

In the illustrated position of the changeover valve 69, the fluid stream is conveyed directly by the pump P into the spaces C and D, the fluid passing via the converter 1 into the space B. The return via the longitudinal bore 35 takes place in an unthrottled manner into the reservoir 67. An excess pressure therefore arises on the side of the piston 11 facing the converter and shifts the piston 11 toward the internal combustion engine and thus brings it to rest on the converter casing 3 in the region 15. A non-rotatable connection is formed owing to the friction between the piston 11 and the casing 3 so that the torque is introduced via the casing 3 and the piston 11 into the torsional vibration damper 13 and thence via the hub 21 of the turbine wheel 23 and the teeth 27 directly onto the driven shaft 29. The torque is thus transmitted directly via the torsional vibration damper 13 while avoiding the converter circuit. The process of switching from the released state into the closed state of the lock-up clutch 9 takes place very safely as the fluid can issue from the space A via the channels 53, the blind hole 51, the space E and the longitudinal bore 35 without obstruction into the reservoir 67 and an excess pressure may be produced in the chamber B as the connection from here to chamber E via the channels 57 and 53 designed as throttle points is obstructed. In the second position of the changeover valve 69, the pump P is connected to the longitudinal bore 35 and the return to the spaces C and D. In this case, the full pressure of the fluid is conveyed into the chamber A so that the piston 11 is displaced to the right and loses its torque-transmitting function. At the same time, a proportion of the fluid stream is conveyed at lower pressure into the space B via the space E and the throttle channels 57 and 59 so that the process of venting the lock-up clutch 9 is not obstructed but a proportion of the fluid passes through the space B and via the converter circuit back into the reservoir 67 allowing cooling of the lock-up clutch 9. Such cooling of the piston 11, particularly in the region of its frictional face, is of great importance if the lock-up clutch 9 slipping. When the lock-up clutch is running without slippage, the two channels 57 and 59 act as wear-resistant throttle points to ensure an adequate pressure difference between the spaces B and A for reliable closure of the lock-up clutch 9. The connection of the space A via the channels 53 and the blind hole 51 to an opening diameter which corresponds substantially to the diameter of the longitudinal bore 35 of the driven shaft 29 ensures that no transmission-reducing, i.e. pressure increasing, effect reaches from the spaces E filled with converter fluid and the channels 57 and 59 back into the space B. The design of the hydrodynamic torque converter shown here is substantially independent of the speed and independent of the flow through the channels 57 and 59 with respect to the build-up of pressure in the space A.

Figure 2:
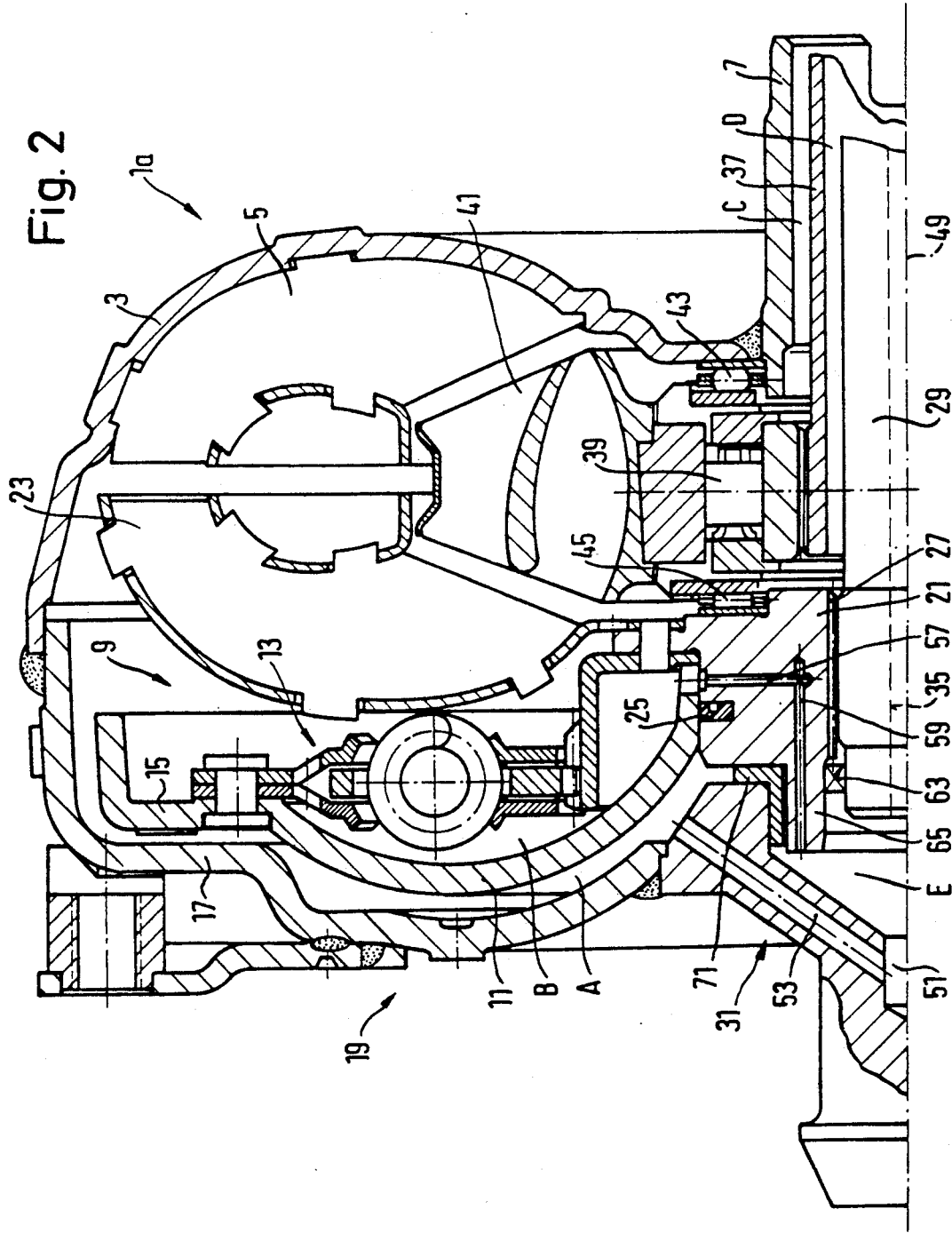
FIG. 2 is the upper half of an axial longitudinal section through a torque converter of similar design.

The hydrodynamic torque converter 1a shown in FIG. 2 differs only in a few details from the previously described construction, but its functioning is identical. The differences will therefore be mentioned only briefly here. Between the hub 21 of the turbine wheel 23 and the bearing projection 31, in this case, there is arranged a bearing 71 which has a radially as well as axially supporting function. As this radial-axial bearing 71 is substantially tight to fluid, one of the two seals according to FIG. 1 may be dispensed with. Therefore, only the seal 63 between the end of the driven shaft 29 on the internal combustion engine side and the hub 21 is provided in this case. The seal 63—as also in FIG. 1—is similarly not absolutely essential as the teeth 27 are arranged between the driven shaft 29 and the hub 21 and can adopt the sealing function. However, these teeth may be subjected to wear, although slight, so a varying flow may occur at this point. The other details of this construction coincide with the foregoing description with respect to design and mode of operation.

Figure 3:
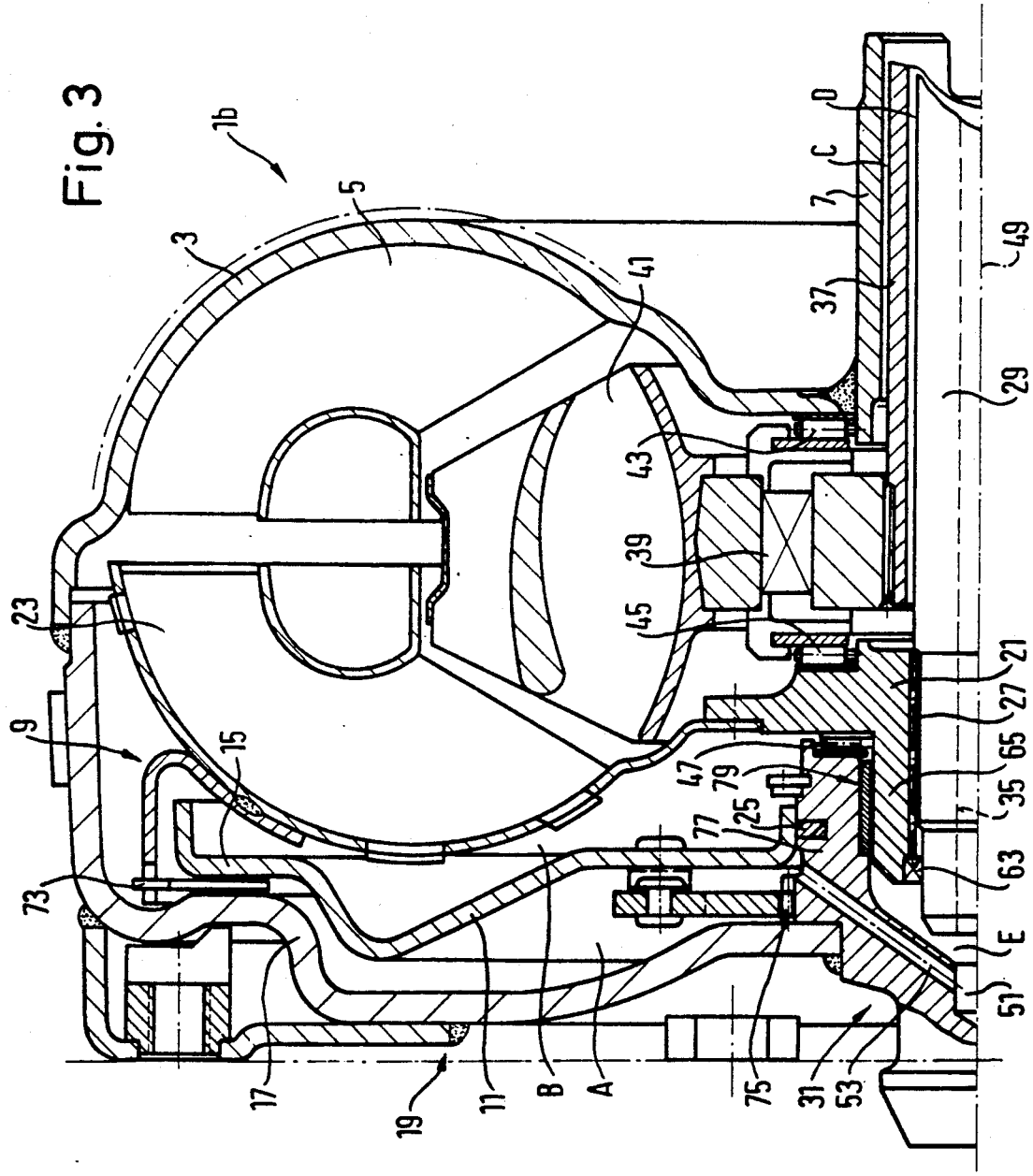
FIG. 3 is the upper half of an axial longitudinal section through a torque converter comprising a lock-up clutch having two transmission faces.
Figure 5A:
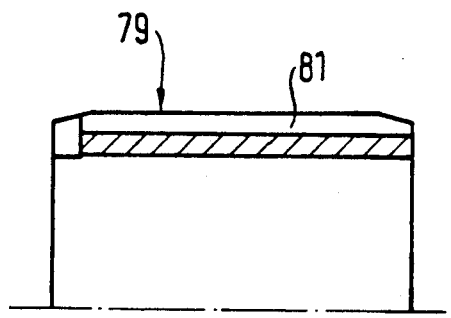
FIGS. 5a and 5b are the upper half of a bearing ring in a longitudinal section and an elevation, respectively.
Figure 5B:
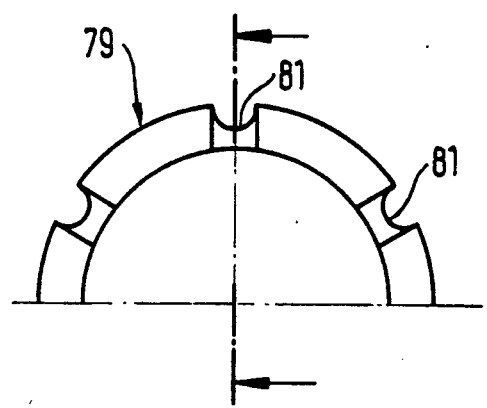

The hydrodynamic torque converter 1b according to FIG. 3 differs in several points from the two constructions described hitherto. The lock-up clutch 9 has a blade 73 which may be brought into frictional contact between the region 17 of the converter casing 3 and the radially outer region 15 of the piston 11. It is guided radially outwardly beyond the piston 11 and is non-rotatably connected directly to the outer shell of the turbine wheel 23 there. A torsional vibration damper may optionally be inserted into this connection. A greater torque transmission capacity is achieved by the arrangement of this blade 73 and the piston 11 is non-rotatably but axially displaceably connected via a corresponding arrangement 75 to the converter casing 3, in the present case to the bearing projection 31 which is also non-rotatably arranged on the converter casing 3. The bearing projection 31 is provided with an integral supporting ring 77 which extends away from the internal combustion engine and, on its outer periphery, carries out the guidance of the piston 11 sealed at 25, carries a bearing ring 79 in a bore and communicates with the thrust bearing 47 at its face end. Between the piston 11 and the converter casing 3 there is formed the space A which communicates via obliquely radially extending channels 53 with a central blind hole 51. The bearing ring 79 leads the hub 21 of the turbine wheel 23 on a cylindrical outer face of its attachment 65. The two thrust bearings 43 and 45 as well as the freewheel 39 and the diffusion wheel 41 are arranged between the hub 21 and the driven-side region of the converter. The driven shaft 29 is non-rotatably connected via the teeth 27 to the hub 21 of the turbine wheel 23. The seal 63 is arranged between these teeth 27 and the part of the driven shaft 29 projecting in the direction of the internal combustion engine. It seals the space E relative to the teeth 27. The space E communicates, on the one hand, with the longitudinal bore 35 in the driven shaft 29 and on the other hand via the blind hole 51 and the channels 53 with the space A as well as via longitudinally extending channels in the bearing ring 79 with the space B. Reference is made to FIGS. 5a and 5b which shows the bearing ring 79 in detail. The bearing ring 79 is inserted with its external diameter in a bore of the supporting ring 77. It has one or more longitudinal grooves 81 in the region of its external periphery. These channels formed by the grooves 81 are designed as throttle points and produce the connection between the spaces E and B. They have the same function as the channels 57 and 59 in FIGS. 1 and 2.

Figure 4:
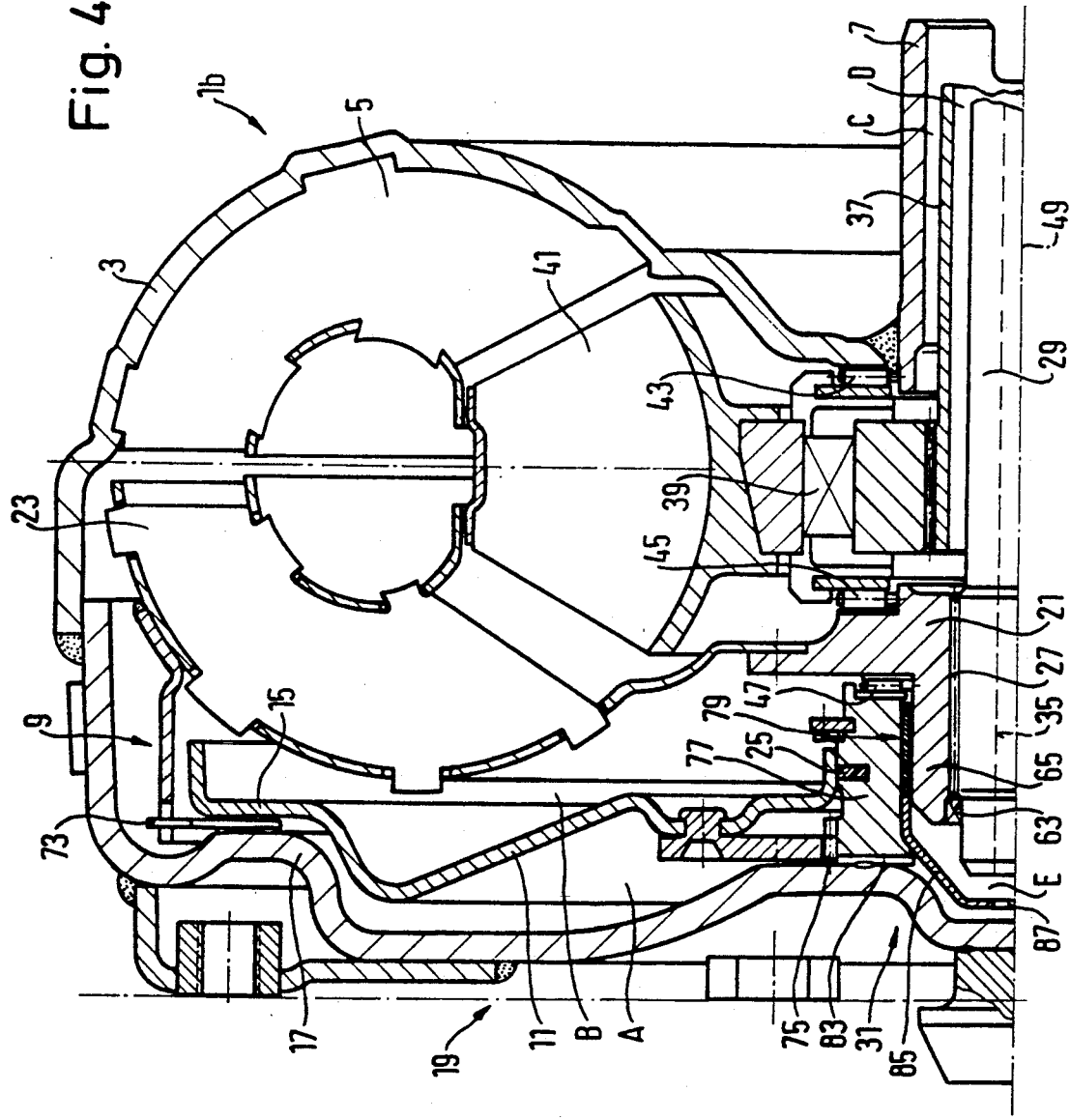
FIG. 4 is the upper half of an axial longitudinal section through a torque converter comprising a multi-part hub projection.

FIG. 4 shows a variation of FIG. 3, the bearing projection 31 merely being constructed in several parts in contrast to FIG. 3. In the present case, the supporting ring 77 is produced as a separate component and is welded to the converter casing 3 in the region of the bearing projection 31. Radially extending channels 83 which allow a throttle-free connection between the spaces A and B are applied prior to welding on the region of the supporting ring 77 facing the region 19 of the converter casing 3. As already described in FIG. 3, the bearing ring 79 which is designed according to FIG. 5b and forms the throttle channels 81 is arranged on an internal diameter of the supporting ring 77 of the bearing ring 79. In contrast to FIG. 3, however, a pot-shaped sheet metal part 85 is then inserted onto the bearing ring 79 in the direction of the internal combustion engine, a central opening 87 having substantially the diameter of the longitudinal bore 35 of the driven shaft 29 being arranged in the base of the pot-shaped sheet metal part 85. A seal 63 is similarly provided between the hub 21 of the turbine wheel 23 and the driven shaft 29. The mode of action of this hydrodynamic torque converter corresponds to that of FIGS. 1 to 3. With respect to the lock-up clutch 9, the same applies as in FIG. 3.

The invention described hereinbefore therefore relates to a hydrodynamic torque converter with a lock-up clutch, in which the converter circuit is charged with converter fluid via two reversible lines. A further fluid path which allows cooling of the piston of the lock-up clutch on its back via throttle channels is provided in parallel with the pressure line for opening the lock-up clutch.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

I claim:
1. A hydrodynamic torque converter comprising:
   a converter casing (3) driven in a rotating manner round an axis of rotation (40),
   a driven shaft (29) capable of rotating about the axis of rotation (49),
   a pumping wheel (5) non-rotatably connected to the converter casing (3),
   a turbine wheel (23), arranged non-rotatably by a hub (21) on the driven shaft (29) axially between the pumping wheel (5) and a drive-side wall region (19) of the converter casing (3),
   a reactor wheel (41) which is axially supported on the hub (21) and on the converter casing (3), is radially mounted on a hollow supporting shaft (37) surrounding the driven shaft (29) and can be locked in the direction of rotation, the reactor wheel (41) forming, with the pumping wheel (5) and the turbine wheel (23), a converter-fluid circuit in the converter casing (3),
   a lock-up clutch (23) and the drive-side wall region (19) of the converter casing (3) for fixing the turbine wheel (23) relative to the converter casing (3), the lock-up clutch (9) comprising an axially movable piston (11) which has, in a radially externally located region (15), a frictional face axially opposed to a substantially radially extending region (17) of the converter casing (3),
   a hydraulic fluid supply system (6, 69, P) with a plurality of lines (35, C, D) being reversibly connected to a hydraulic pressure source (P) and by means of which both the converter-fluid circuit is supplied and the lock-up clutch (9) is re-routed, wherein a first one of the lines (C, D) extends outside the driven shaft (29) concentrically to the hollow supporting shaft (37) and is connected to the converter-fluid circuit and a second one of the lines is connected via the driven shaft (29) having a longitudinal bore (35) having an end region which is open facing the drive-side wall region (19)of the converter casing (3) and an adjoining first connecting path (53; 83) to a first region (A) located axially between the piston (11) and the drive-side wall region (19) of the converter casing (3),
   the first connecting path (53; 81), with respect to the longitudinal wall (35) and the open end region of the longitudinal bore (35) having no throttling effect and further being connected via a second connecting path (57, 59; 81) relative to the first connecting path which has a throttling effect (53; 61) to a second region (B) located axially between the piston (11) and the turbine wheel (23).

2. The torque converter as in claim 1, wherein the first connecting path (53; 81) comprises a central chamber (51) which has, axially opposite an end opening of the longitudinal bore (35) of the driven shaft (29), having an opening (87) of which the diameter is approximately equal to the diameter of the longitudinal bore (35), the chamber (51) having a plurality of channels (53; 81) issuing from said chamber to the first region (A).

3. The torque converter as in claim 1, wherein the supporting wheel (41) is supported via a respective axial thrust bearing (43, 45) on the hub (21) of the turbine wheel (23) and the converter casing (3) and wherein the first line has a first annular channel (D) which extends coaxially radially between the driven shaft (29) and the supporting shaft (37) and is connected via the thrust bearing (45) supported on the turbine wheel (23) to the converter-fluid circuit and, moreover, has a second annular channel (C) which extends radially between the supporting shaft (37) and a tube (7) coaxially surrounding the supporting shaft (37) and holding the converter casing (3) and is connected via the thrust bearing (43) supported on the converter casing (3) to the converter-fluid circuit.

4. The torque converter as in claim 1, wherein the hub (21) of the turbine wheel (23) is guided non-rotatably by teeth (27) on the driven shaft (29) and is sealed relative to the driven shaft (29), wherein the piston (11) is axially displaceably guided and sealed on the hub (21), wherein the drive-side wall region (19) of the converter casing (3) comprises a central bearing projection (31) on which an end region (33) of the driven shaft (29) or the hub (21) is radially mounted and wherein the first connecting path has channels (31) leading through the bearing projection (31) and the second connecting path has channels (57, 59) leading through the hub (21).

5. The torque converter as in claim 4, wherein the end region (33) of the driven shaft (29) is mounted on the bearing projection (31) and wherein the hub (21) is sealed by a seal (61) from the bearing projection (31) and, between the seal (61) and the sealed teeth (27), forms an annular region (E) from which the channels (57, 59) leading through the hub (21) issue and which is connected via the driven shaft (29) having a transverse bore (55) which is connected to the longitudinal bore (35) thereof.

6. The torque converter as in claim 4, wherein the hub (21) is mounted in a sealed manner via a combined radial and axial bearing (71) on the bearing projection (31) and wherein the bearing projection (31), the hub (21) and the driven shaft (29) define a region (E) into which the longitudinal bore (35) opens with an end opening and from which the channels (57, 59) leading through the hub (21) and the first connecting path (53) issue.

7. The torque converter as in claim 4, wherein the channels of the hub (21) are designed as throttle bores (57 59).

8. The torque converter as in claim 1, wherein the hub (21) of the turbine wheel (23) is guided by teeth (27) non-rotatably on the driven shaft (29) and is sealed from the driven shaft (29), wherein the piston is axially displaceably guided in a sealed manner on a central bearing projection (31, 77) of the drive-side wall region (19) of the converter casing (3) in a sealed manner, wherein hub (21)is radially mounted via a bearing ring (79) in the bearing projection (31, 77) having a central bearing opening and is axially supported via an axial bearing (47) on an end face of the bearing projection (31, 77), and wherein longitudinal bore (35) of the driven shaft (29) has an end opening which opens into a region (E) which is defined by the bearing projection (31, 77), the hub (21) and the driven shaft (29) and from which the first connecting path (53; 83) and the second connecting path (81) issue, the first connecting path having channels leading through the bearing projection and the second connecting path having channels extending through the bearing ring.

9. The torque converter as in claim 8, wherein the piston (11) is non-rotatably connected to the converter casing (3) and at least one friction blade (73) non-rotatably connected to the turbine wheel (23) is arranged between the drive-side wall region (19) of the converter casing (3) and the frictional face of the piston (11).

10. The torque converter as in claim 8, wherein the bearing ring (79) has channels that designed as axially extending grooves (81).

11. The torque converter as in claim 8, wherein the bearing projection (31, 77) comprises a supporting ring (77) which is welded on the drive-side wall region (19) of the converter casing (3) and of which the end face turned toward the wall region (19) together with the wall region (19) has a plurality of radially extending channels (81) of the first connecting path and wherein, in the supporting ring (77) in the region between the end face forming the channels (81) and the bearing ring there is inserted a bowl-shaped sheet metal part (85) of which the base has a central opening (87) of which the diameter is substantially equal to the diameter of the end opening of the longitudinal bore (35) of the driven shaft (29).

12. The torque converter as in claim 1, wherein the bearing projection (31) has channels that are designed as bores (53) which extend obliquely to the axis of rotation (49) and open into the bearing projection (31) having a central chamber (50).

* * * * *